(12) United States Patent
Ramachandran et al.

(10) Patent No.: US 11,631,011 B2
(45) Date of Patent: Apr. 18, 2023

(54) AUTOMATICALLY REMEDIATING STORAGE DEVICE ISSUES USING MACHINE LEARNING TECHNIQUES

(71) Applicant: EMC IP Holding Company LLC, Hopkinton, MA (US)

(72) Inventors: Ramya Ramachandran, Hopkinton, MA (US); Davidson Devasigamony, Boxborough, MA (US); Jai Kumar, Hopedale, MA (US); Sean Soltysik, Boylston, MA (US); Alik Saring, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 479 days.

(21) Appl. No.: 16/778,792

(22) Filed: Jan. 31, 2020

(65) Prior Publication Data

US 2021/0241132 A1   Aug. 5, 2021

(51) Int. Cl.
| | |
|---|---|
| *G06F 11/00* | (2006.01) |
| *G06N 5/04* | (2023.01) |
| *G06F 3/06* | (2006.01) |
| *G06N 20/00* | (2019.01) |
| *G06F 11/07* | (2006.01) |

(52) U.S. Cl.
CPC ............... *G06N 5/04* (2013.01); *G06F 3/067* (2013.01); *G06F 3/0614* (2013.01); *G06F 3/0653* (2013.01); *G06N 20/00* (2019.01); *G06F 11/0793* (2013.01)

(58) Field of Classification Search
CPC .................................................. G06F 11/0793
See application file for complete search history.

(56) References Cited

U.S. PATENT DOCUMENTS

| | | | |
|---|---|---|---|
| 7,730,364 B2 * | 6/2010 | Chang ................. | H04L 41/0663 |
| | | | 714/47.2 |
| 9,436,826 B2 | 9/2016 | Kapoor et al. | |
| 9,558,352 B1 * | 1/2017 | Dennison ............... | G06F 21/566 |
| 10,362,135 B2 | 7/2019 | McNeese et al. | |
| 2018/0096260 A1 * | 4/2018 | Zimmer .................. | G06N 5/04 |
| 2018/0211039 A1 | 7/2018 | Tamir et al. | |
| 2020/0349169 A1 * | 11/2020 | Venkatesan ............ | G06N 5/003 |
| 2021/0097431 A1 * | 4/2021 | Olgiati ................... | G06N 5/046 |

* cited by examiner

*Primary Examiner* — Amine Riad
(74) *Attorney, Agent, or Firm* — Ryan, Mason & Lewis, LLP (57) ABSTRACT

Methods, apparatus, and processor-readable storage media for automatically remediating storage device issues using machine learning techniques are provided herein. An example computer-implemented method includes obtaining performance-related information pertaining to one or more storage devices; automatically determining one or more workflows to be executed in connection with remediating at least one issue attributed to at least a portion of the one or more storage devices, wherein determining the one or more workflows comprises applying one or more machine learning techniques to the obtained performance-related information; and performing one or more automated actions based at least in part on the one or more workflows.

20 Claims, 6 Drawing Sheets

AUTOMATICALLY REMEDIATING STORAGE DEVICE ISSUES USING MACHINE LEARNING TECHNIQUES

FIELD

The field relates generally to information processing systems, and more particularly to storage in such systems.

BACKGROUND

Storage device health and/or performance issues are commonly identified via conventional monitoring tools. Such conventional monitoring tools, however, typically do not address the remediation of the identified issues. Moreover, remediation of such identified issues commonly requires manual review of the identified issues and subsequent manual performance of one or more actions through a separate remediation tool. Such a procedure often and disadvantageously results in human error. Also, such a procedure involves delays, which can be critical for certain storage device issues needing prompt or immediate attention.

SUMMARY

Illustrative embodiments of the disclosure provide techniques for automatically remediating storage device issues using machine learning techniques. An exemplary computer-implemented method includes obtaining performance-related information pertaining to one or more storage devices, and automatically determining one or more workflows to be executed in connection with remediating at least one issue attributed to at least a portion of the one or more storage devices, wherein determining the one or more workflows includes applying one or more machine learning techniques to the obtained performance-related information. Further, the method also includes performing one or more automated actions based at least in part on the one or more workflows.

Illustrative embodiments can provide significant advantages relative to conventional monitoring techniques. For example, problems associated with human error and delays are overcome in one or more embodiments through integrating monitoring tools with provisioning tools via the use of machine learning techniques to automatically remediate storage device issues.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
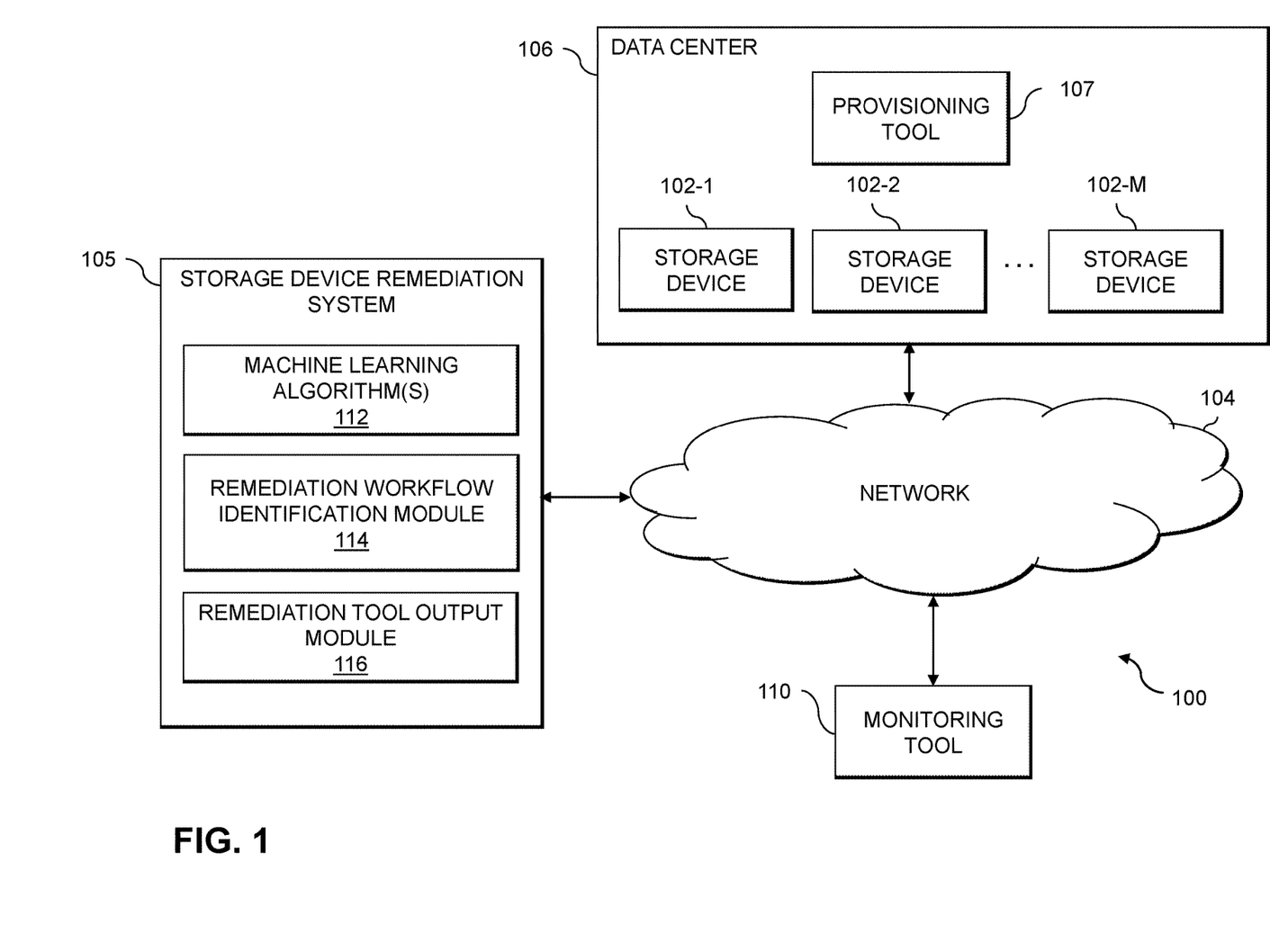
FIG. 1 shows an information processing system configured for automatically remediating storage device issues using machine learning techniques via a software as a service (SAAS) offering in an illustrative embodiment.

FIG. 1 shows a computer network (also referred to herein as an information processing system) 100 configured in accordance with an illustrative embodiment. The computer network 100 comprises a data center 106 which includes a provisioning tool 107 and a plurality of storage devices 102-1, 102-2, . . . 102-M, collectively referred to herein as storage devices 102. The storage devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is storage device remediation system 105 and monitoring tool 110.

The storage devices 102 in some embodiments comprise respective devices associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, in one or more embodiments, the storage device remediation system 105 can have an associated database configured to store data pertaining to performance-related information derived from various storage devices, and identification of workflows implemented in connection with one or more performance-related issues.

The database in the present embodiment is implemented using one or more storage systems associated with the storage device remediation system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the storage device remediation system 105 are input-output devices, which illustratively comprise keyboards, displays or other types of input-output devices in any combination. Such input-output devices can be used, for example, to support one or more user interfaces to the storage device remediation system 105, as well as to support communication between the storage device remediation system 105 and other related systems and devices not explicitly shown.

The storage device remediation system 105 in the FIG. 1 embodiment is assumed to be implemented using at least one processing device. Each such processing device generally comprises at least one processor and an associated memory, and implements one or more functional modules for controlling certain features of the storage device remediation system 105.

More particularly, the storage device remediation system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface allows the storage device remediation system 105 to communicate over the network 104 with the data center 106, and illustratively comprises one or more conventional transceivers.

The storage device remediation system 105 further comprises machine learning algorithm(s) 112, a remediation workflow identification module 114, and a remediation tool output module 116.

It is to be appreciated that this particular arrangement of modules 112, 114, and 116 illustrated in the storage device remediation system 105 of the FIG. 1 embodiment is presented by way of example only, and alternative arrangements can be used in other embodiments. For example, the functionality associated with modules 112, 114, and 116 in other embodiments can be combined into a single module, or separated across a larger number of modules. As another example, multiple distinct processors can be used to implement different ones of modules 112, 114, and 116 or portions thereof.

At least portions of modules 112, 114, and 116 may be implemented at least in part in the form of software that is stored in memory and executed by a processor.

It is to be understood that the particular set of elements shown in FIG. 1 for automatically remediating storage device issues using machine learning techniques involving storage devices 102 of computer network 100 is presented by way of illustrative example only, and in other embodiments additional or alternative elements may be used. Thus, another embodiment includes additional or alternative systems, devices and other network entities, as well as different arrangements of modules and other components.

Figure 2:
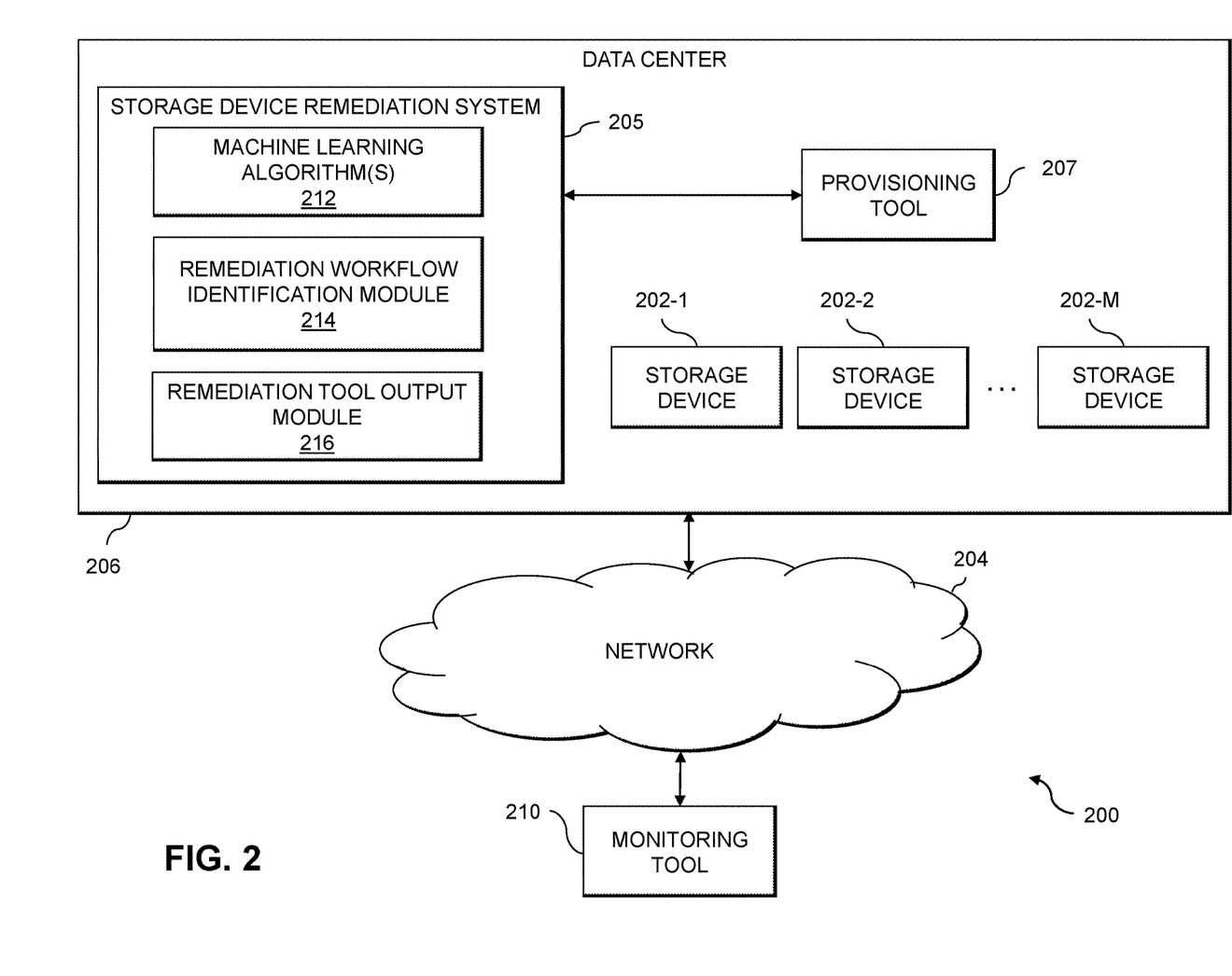
FIG. 2 shows an information processing system configured for automatically remediating storage device issues using machine learning techniques via an on-premise offering in an illustrative embodiment.

An exemplary process utilizing modules 112, 114, and 116 of example storage device remediation system 105 in computer network 100 (or modules 212, 214, and 216 of example storage device remediation system 205 in computer network 200) will be described in more detail with reference to the flow diagram of FIG. 4.

Accordingly, at least one embodiment of the invention includes carrying out proactive storage management as well as remediating storage health issues (e.g., reactive management), and integrating such operations with storage management tools. Such actions can be based, for example, on predictive analytics data. In such an embodiment, storage health issues reported by a storage monitoring tool are processed and remedied by identifying and executing one or more workflows via a provisioning tool. At least one embodiment also includes using predictive analytics used for capacity prediction in storage monitoring tools to automatically expand storage objects by executing one or more remedial workflows if storage objects are predicted to become full within a given temporal duration.

Accordingly, and as further detailed herein, one or more embodiments include automatically remediating storage system health issues reported by monitoring and reporting tools (which typically do not have such remediation functionalities). One or more embodiments integrate active management tools with monitoring and reporting tools for automatically and efficiently remediating reported and/or predicted health issues.

Also, one or more embodiments can include an automated process for obtaining user approval for one or more remediation actions. Additionally or alternatively, such an embodiment can include obtaining a list of pre-approved actionable events that can be generated and/or maintained for certain workflows to be automatically executed to remediate a storage health issue. At least one embodiment can include using storage monitoring predictive analytics that learn and adjust to a user environment, and provide information about future capacity growth and performance needs. Additionally or alternatively, at least one embodiment can include proactively expanding one or more storage objects based, for instance, on capacity prediction results. By way of example, a user can define a rule that when a storage capacity prediction of a file system reaches "within a month," then the volume capacity is to be expanded by 20% or by some other fixed size.

By way of illustration, consider an example use case wherein a storage monitoring tool reports and/or displays health issues of a storage system and/or device (e.g., unresponsiveness caused due to high read/write response times on a storage group). At least one embodiment includes processing such reported and/or displayed issues, and querying the storage user to determine if the user would like to mitigate this health/performance issue. Upon receiving an affirmative confirmation from the user, a provisioning tool workflow is initiated by one or more embodiments to resolve the health/performance issue (e.g., by adding more ports to a port group). After the workflow completes, it returns with a results indication (i.e., success, failure, or partial success) and the root cause of the health/performance issue.

As further detailed herein, one or more users may want to run the techniques detailed herein locally in their data center (as depicted in FIG. 2), while other users may instead want to run the techniques detailed herein as an off-premise SAAS offering (as depicted in FIG. 1).

Referring again to FIG. 1, the figure shows an information processing system configured for automatically remediating storage device issues using machine learning techniques via a SAAS offering in an illustrative embodiment. In an example use case implementing the SAAS offering depicted in FIG. 1, the monitoring tool 110 can receive telemetry data from the storage devices 102 via data center 106. Additionally, when an event is detected by the monitoring tool 110 with respect to storage health issues and/or storage capacity predictions, such an event is output and/or provided to the storage device remediation system 105. The storage device remediation system 105 then generates an actionable event from the health issues and/or prediction results, for example, by converting a health issue to an actionable event and sending identification of the actionable event to the provisioning tool 107 within data center 106. Such an actionable event can be pre-approved by the user or can require manual user approval.

In such an embodiment, the actionable event includes a remediation operation which triggers a workflow to be executed by the provisioning tool 107. When implementing such an embodiment, it can be expected that this health issue will be moved to a resolved state, which will be reflected in the next telemetry data from the array.

FIG. 2 shows an information processing system configured for automatically remediating storage device issues using machine learning techniques via an on-premise offering in an illustrative embodiment. Specifically, FIG. 2 is similar to the embodiment depicted in FIG. 1 (including the functionality of monitoring tool 210), but in the FIG. 2 embodiment, storage device remediation system 205 (with modules 212, 214, and 216) is located on-premise with data center 206, along with provisioning tool 207 and storage devices 202-1, 202-2, . . . 202-M, collectively referred to herein as storage devices 202. Accordingly, the steps described above in connection with FIG. 1 are carried out in a similar manner in the FIG. 2 embodiment, but the storage device remediation system 205 is running locally on the data center 206 associated with the user.

Figure 3:
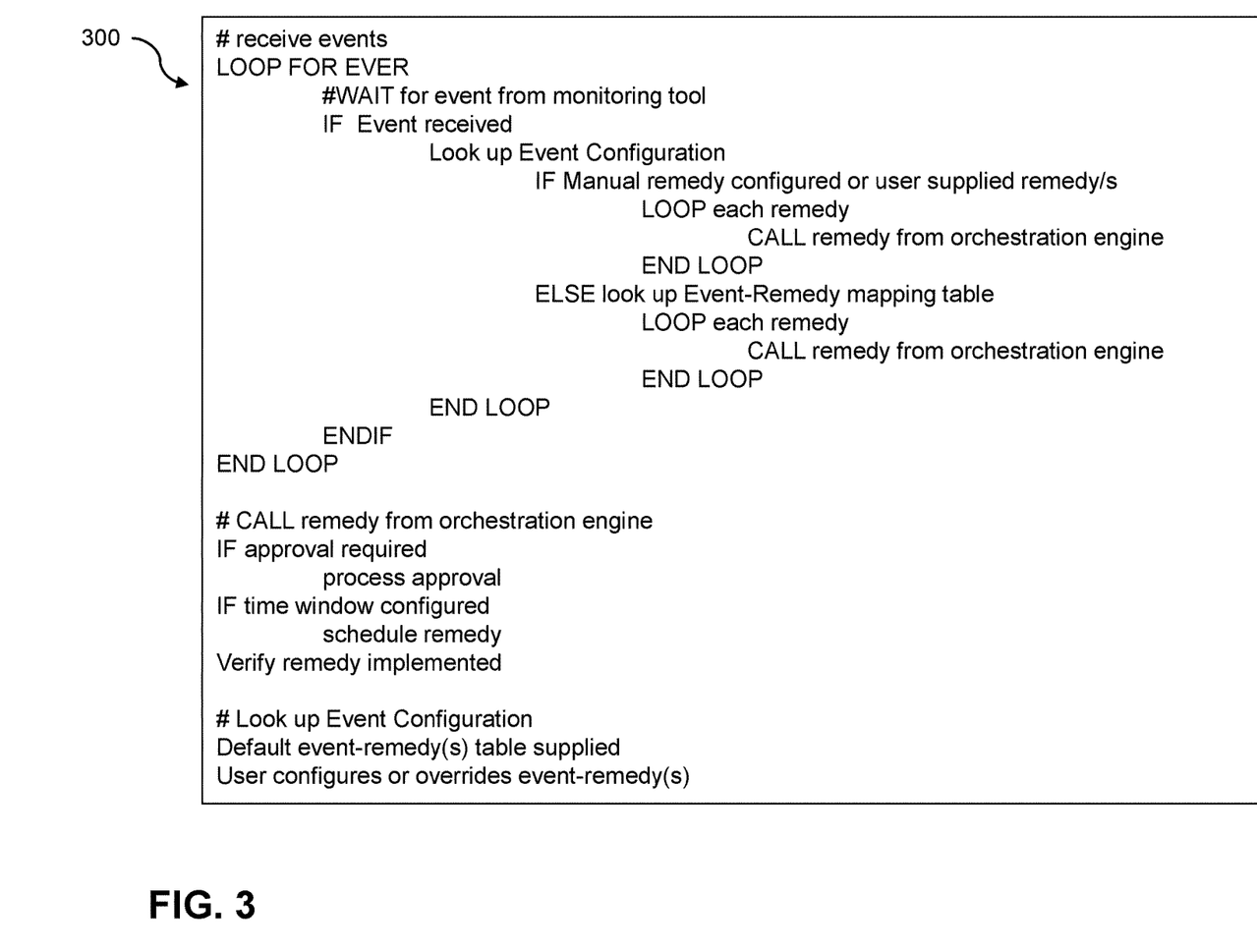
FIG. 3 shows example pseudocode for automatically remediating storage device issues using machine learning techniques in an illustrative embodiment.

FIG. 3 shows example pseudocode for automatically remediating storage device issues using machine learning techniques in an illustrative embodiment. Any combination of one or more computer languages can be used to implement the pseudocode 300, which may be executed by or under the control of a processing device, such as storage device remediation system 105 or 205. For example, the pseudocode 300 may be viewed as comprising a portion of a software implementation of at least part of modules 112, 114 and/or 116 of the FIG. 1 embodiment (or modules 212, 214 and/or 216 of the FIG. 2 embodiment).

The pseudocode 300 illustrates receiving event notifications from a monitoring tool, identifying a remedial action from an orchestration engine related to the event, and initiating the remedial action. It is to be appreciated that this particular pseudocode shows just one example implementation of a process for automatically remediating storage device issues using machine learning techniques, and alternative implementations of the process can be used in other embodiments.

Figure 4:
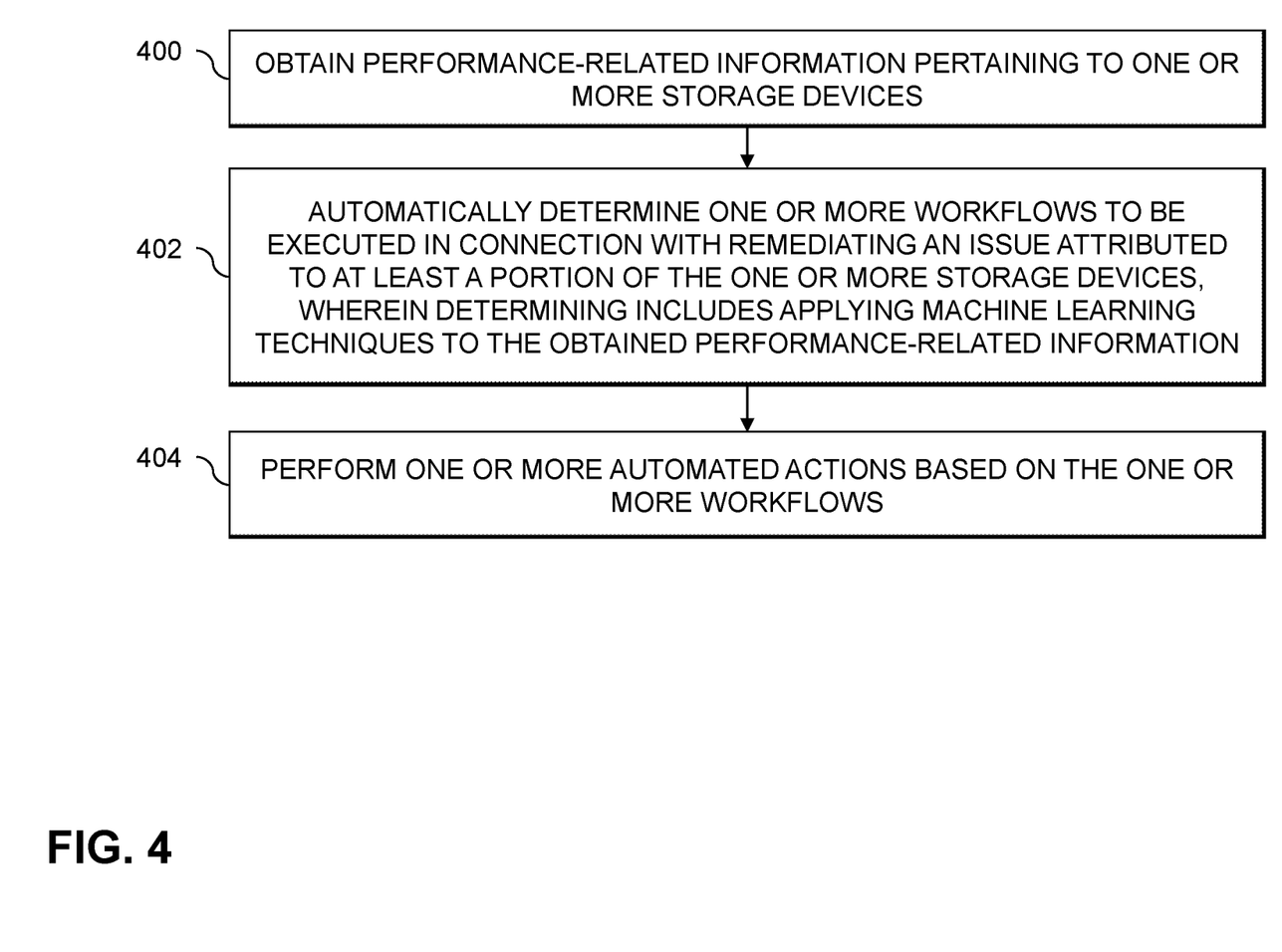
FIG. 4 is a flow diagram of a process for automatically remediating storage device issues using machine learning techniques in an illustrative embodiment.

FIG. 4 is a flow diagram of a process for automatically remediating storage device issues using machine learning techniques in an illustrative embodiment. It is to be understood that this particular process is only an example, and additional or alternative processes can be carried out in other embodiments.

In this embodiment, the process includes steps 400 through 404. These steps are assumed to be performed by the storage device remediation system 105 (or 205) utilizing its modules 112, 114, and/or 116 (or modules 212, 214, and/or 216).

Step 400 includes obtaining performance-related information pertaining to one or more storage devices. Step 402 includes automatically determining one or more workflows to be executed in connection with remediating at least one issue attributed to at least a portion of the one or more storage devices, wherein determining the one or more workflows comprises applying one or more machine learning techniques to the obtained performance-related information. Determining the one or more workflows can include comparing at least a portion of the obtained performance-related information to a dynamic set of configuration information pertaining to multiple storage device remediation workflows. Additionally, comparing the at least a portion of the obtained performance-related information to the dynamic set of configuration information can include utilizing at least one lookup table.

In at least one embodiment, the one or more machine learning techniques can include a K-means clustering algorithm with TensorFlow, configured for lookup and/or comparison processes to group one or more health issues generated by monitoring and/or reporting tools (e.g., performance issues, configuration issues, capacity issues, component issues, hardware issues, data protection issues, high availability issues, etc.) and to identify one or more remediation workflows to be executed by at least one storage automation and/or orchestration tool.

In one or more embodiments, the performance-related information identifies at least one performance-related event reported by a storage device monitoring tool. In such an embodiment, determining one or more workflows to be executed in connection with remediating at least one issue includes determining one or more workflows to be executed in connection with reactively remediating the at least one performance-related event reported by a storage device monitoring tool. Also, in at least one embodiment, the performance-related information includes a prediction of at least one performance-related issues generated by the storage device monitoring tool. In such an embodiment, determining one or more workflows to be executed in connection with remediating at least one issue includes determining one or more workflows to be executed in connection with proactively remediating the prediction of at least one performance-related issues generated by the storage device monitoring tool.

Step 404 includes performing one or more automated actions based at least in part on the one or more workflows. Performing the one or more automated actions can include automatically outputting an identification of the one or more workflows to at least one provisioning tool associated with the one or more storage devices. Additionally or alternatively, performing the one or more automated actions can include automatically outputting an identification of the one or more workflows to at least one user associated with the one or more storage devices for execution approval and/or automatically outputting an identification of the one or more workflows and an indication of user approval of the one or more workflows to at least one provisioning tool associated with the one or more storage devices.

In at least one embodiment, an example workflow includes adding one or more ports to a port group to increase input/output (IO) rate responsive to a host event reported by a storage monitoring tool. Also, another example workflow can include expanding a logical unit number (LUN) and/or file system based at least in part on issues reported by a storage monitoring tool.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to integrate monitoring tools with provisioning tools via the use of machine learning techniques to automatically remediate storage device issues. These and other embodiments can effectively overcome problems associated with human error and delays. Also, these and other embodiments can effectively improve the reliability of storage systems by remediating issues more efficiently than conventional techniques.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments (such as, for example, system 200).

Figure 5:
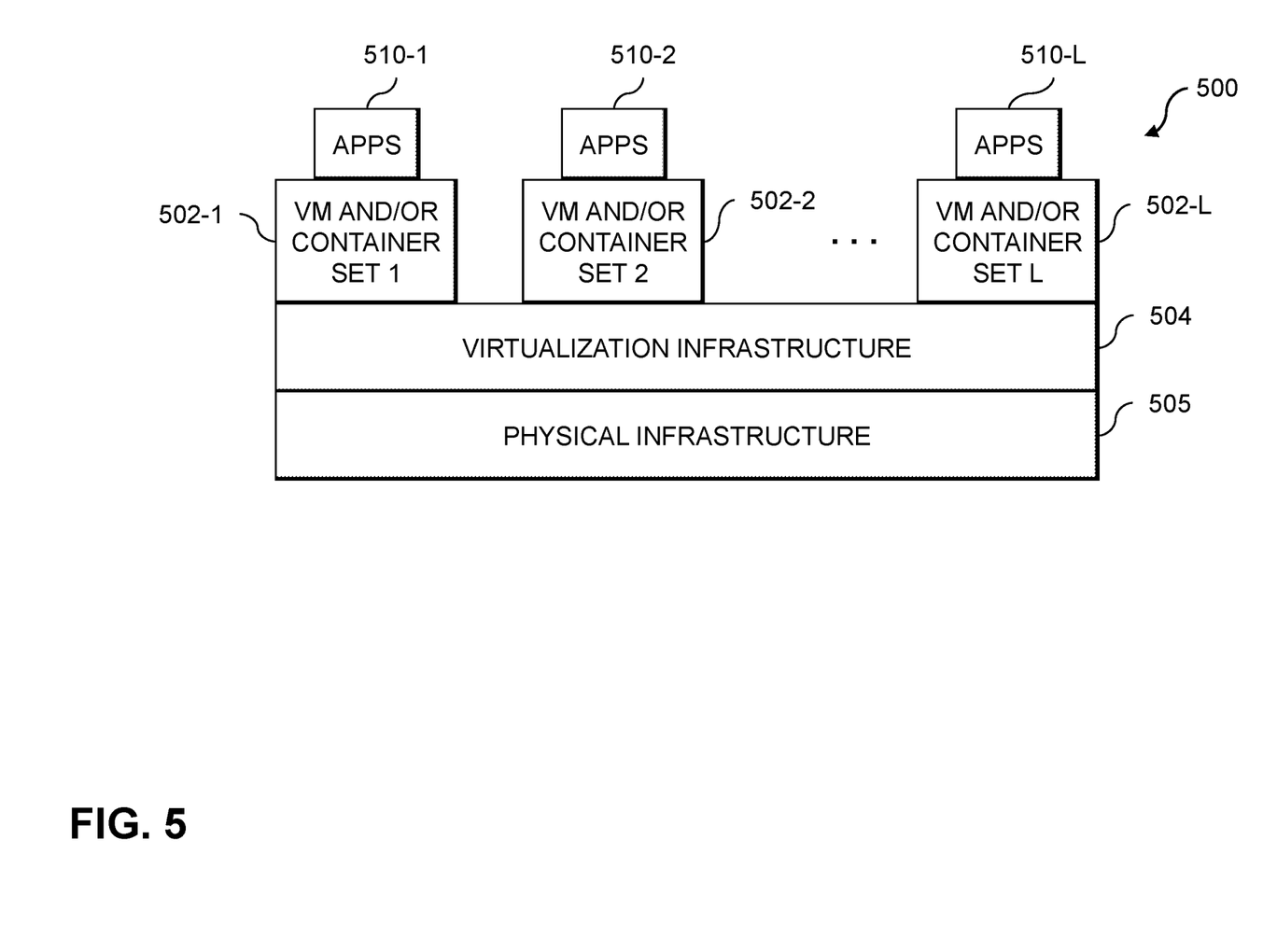
FIGS. 5 and 6 show examples of processing platforms that may be utilized to implement at least a portion of an information processing system in illustrative embodiments.
Figure 6:
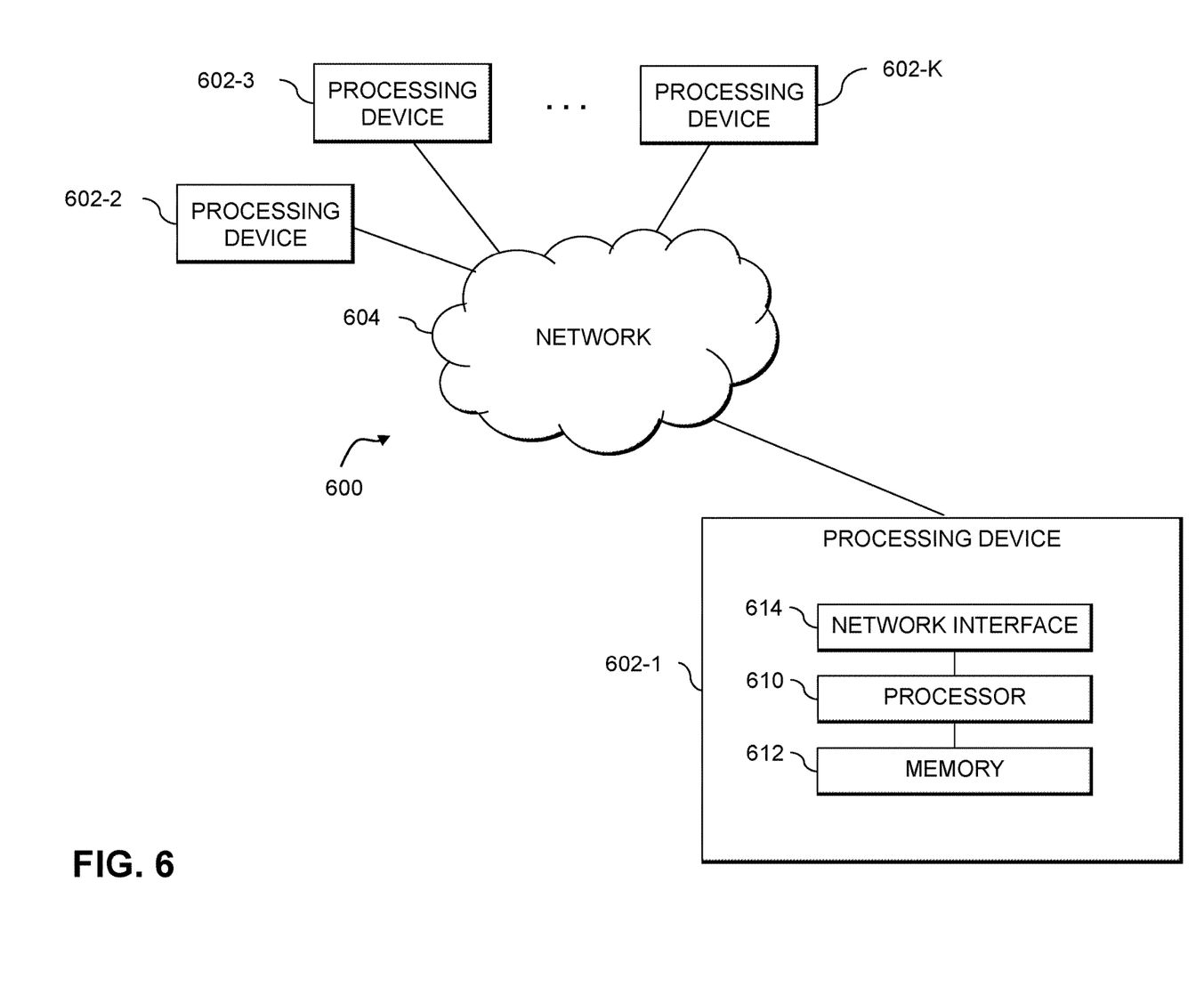

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an application-specific integrated circuit (ASIC), a field-programmable gate array (FPGA) or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of computing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   obtaining performance-related information pertaining to one or more storage devices;
   automatically determining one or more workflows to be executed in connection with remediating at least one issue attributed to at least a portion of the one or more storage devices, wherein determining the one or more workflows comprises applying one or more machine learning techniques to the obtained performance-related information and comparing at least a portion of the obtained performance-related information to at least one set of configuration information pertaining to multiple storage device remediation workflows; and
   performing one or more automated actions based at least in part on the one or more workflows, wherein performing one or more automated actions comprises automatically initiating at least a portion of the one or more workflows related to adding one or more ports to at least one port group associated with the at least a portion of the one or more storage devices;
   wherein the method is performed by at least one processing device comprising a processor coupled to a memory.

2. The computer-implemented method of claim 1, wherein comparing the at least a portion of the obtained performance-related information to the at least one set of configuration information comprises utilizing at least one lookup table.

3. The computer-implemented method of claim 1, wherein performing the one or more automated actions comprises automatically outputting an identification of the one or more workflows to at least one provisioning tool associated with the one or more storage devices.

4. The computer-implemented method of claim 1, wherein performing the one or more automated actions comprises automatically outputting an identification of the one or more workflows to at least one user associated with the one or more storage devices for execution approval.

5. The computer-implemented method of claim 1, wherein performing the one or more automated actions comprises automatically outputting an identification of the one or more workflows and an indication of user approval of the one or more workflows to at least one provisioning tool associated with the one or more storage devices.

6. The computer-implemented method of claim 1, wherein the performance-related information identifies at least one performance-related event reported by a storage device monitoring tool.

7. The computer-implemented method of claim 6, wherein determining one or more workflows to be executed in connection with remediating at least one issue comprises determining one or more workflows to be executed in connection with reactively remediating the at least one performance-related event reported by the storage device monitoring tool.

8. The computer-implemented method of claim 1, wherein the performance-related information comprises a prediction of at least one performance-related issues generated by a storage device monitoring tool.

9. The computer-implemented method of claim 8, wherein determining one or more workflows to be executed in connection with remediating at least one issue comprises determining one or more workflows to be executed in connection with proactively remediating the prediction of at least one performance-related issues generated by the storage device monitoring tool.

10. A non-transitory processor-readable storage medium having stored therein program code of one or more software programs, wherein the program code when executed by at least one processing device causes the at least one processing device:
   to obtain performance-related information pertaining to one or more storage devices;
   to automatically determine one or more workflows to be executed in connection with remediating at least one issue attributed to at least a portion of the one or more storage devices, wherein determining the one or more workflows comprises applying one or more machine learning techniques to the obtained performance-related information and comparing at least a portion of the obtained performance-related information to at least one set of configuration information pertaining to multiple storage device remediation workflows; and
   to perform one or more automated actions based at least in part on the one or more workflows, wherein performing one or more automated actions comprises automatically initiating at least a portion of the one or more workflows related to adding one or more ports to at least one port group associated with the at least a portion of the one or more storage devices.

11. The non-transitory processor-readable storage medium of claim 10, wherein comparing the at least a portion of the obtained performance-related information to the at least one set of configuration information comprises utilizing at least one lookup table.

12. The non-transitory processor-readable storage medium of claim 10, wherein performing the one or more automated actions comprises automatically outputting an identification of the one or more workflows to at least one provisioning tool associated with the one or more storage devices.

13. The non-transitory processor-readable storage medium of claim 10, wherein performing the one or more automated actions comprises automatically outputting an identification of the one or more workflows to at least one user associated with the one or more storage devices for execution approval.

14. An apparatus comprising:
   at least one processing device comprising a processor coupled to a memory;
   the at least one processing device being configured:
     to obtain performance-related information pertaining to one or more storage devices;
     to automatically determine one or more workflows to be executed in connection with remediating at least one issue attributed to at least a portion of the one or more storage devices, wherein determining the one or more workflows comprises applying one or more machine learning techniques to the obtained performance-related information and comparing at least a portion of the obtained performance-related information to at least one set of configuration information pertaining to multiple storage device remediation workflows; and
     to perform one or more automated actions based at least in part on the one or more workflows, wherein performing one or more automated actions comprises automatically initiating at least a portion of the one or more workflows related to adding one or more ports to at least one port group associated with the at least a portion of the one or more storage devices.

15. The apparatus of claim 14, wherein comparing the at least a portion of the obtained performance-related information to the at least one set of configuration information comprises utilizing at least one lookup table.

16. The apparatus of claim 14, wherein performing the one or more automated actions comprises automatically outputting an identification of the one or more workflows to at least one provisioning tool associated with the one or more storage devices.

17. The apparatus of claim 14, wherein performing the one or more automated actions comprises automatically outputting an identification of the one or more workflows to at least one user associated with the one or more storage devices for execution approval.

18. The apparatus of claim 14, wherein performing the one or more automated actions comprises automatically outputting an identification of the one or more workflows and an indication of user approval of the one or more workflows to at least one provisioning tool associated with the one or more storage devices.

19. The apparatus of claim 14, wherein the performance-related information identifies at least one performance-related event reported by a storage device monitoring tool.

20. The apparatus of claim 14, wherein the performance-related information comprises a prediction of at least one performance-related issues generated by a storage device monitoring tool.

* * * * *

UNITED STATES PATENT AND TRADEMARK OFFICE
CERTIFICATE OF CORRECTION

PATENT NO. : 11,631,011 B2
APPLICATION NO. : 16/778792
DATED : April 18, 2023
INVENTOR(S) : Ramya Ramachandran et al.

It is certified that error appears in the above-identified patent and that said Letters Patent is hereby corrected as shown below:

In the Claims

In Claim 8, Column 11, Lines 33-36, replace:
"The computer-implemented method of claim 1, wherein the performance-related information comprises a prediction of at least one performance-related issues generated by a storage device monitoring tool."
With:
-- The computer-implemented method of claim 1, wherein the performance-related information comprises a prediction of at least one performance-related issue generated by a storage device monitoring tool. --

In Claim 9, Column 11, Lines 37-43, replace:
"The computer-implemented method of claim 8, wherein determining one or more workflows to be executed in connection with remediating at least one issue comprises determining one or more workflows to be executed in connection with proactively remediating the prediction of at least one performance-related issues generated by the storage device monitoring tool."
With:
-- The computer-implemented method of claim 8, wherein determining one or more workflows to be executed in connection with remediating at least one issue comprises determining one or more workflows to be executed in connection with proactively remediating the prediction of at least one performance-related issue generated by the storage device monitoring tool. --

In Claim 20, Column 13, Lines 1-4, replace:
"The apparatus of claim 14, wherein the performance-related information comprises a prediction of at least one performance-related issues generated by a storage device monitoring tool."
With:
-- The apparatus of claim 14, wherein the performance-related information comprises a prediction of at least one performance-related issue generated by a storage device monitoring tool. --

Signed and Sealed this
Thirtieth Day of January, 2024

Katherine Kelly Vidal
*Director of the United States Patent and Trademark Office*